United States Patent
Ohta

(10) Patent No.: US 7,236,260 B2
(45) Date of Patent: Jun. 26, 2007

(54) PRINT SERVER APPARATUS, PRINT JOB RESERVATION MANAGEMENT METHOD, RESERVATION JOB GENERATION METHOD AND MEMORY MEDIUM

(75) Inventor: Satoshi Ohta, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 34 days.

(21) Appl. No.: 11/220,538

(22) Filed: Sep. 8, 2005

(65) Prior Publication Data
US 2006/0001908 A1    Jan. 5, 2006

Related U.S. Application Data

(62) Division of application No. 09/676,091, filed on Oct. 2, 2000, now Pat. No. 7,130,068.

(30) Foreign Application Priority Data
Oct. 5, 1999   (JP)   ................................ 11-284288

(51) Int. Cl.
   *G06F 15/00*   (2006.01)
   *G06K 1/00*    (2006.01)
(52) U.S. Cl. .................... 358/1.15; 358/1.15; 358/1.16
(58) Field of Classification Search .................. 358/1.1, 358/1.9, 1.11–1.18, 524; 400/61, 70, 76

See application file for complete search history.

(56) References Cited

U.S. PATENT DOCUMENTS

| 5,761,480 | A |   | 6/1998 | Fukuda et al. ............... 345/501 |
| 5,970,228 | A |   | 10/1999 | Nezu .......................... 713/200 |
| 6,068,361 | A |   | 5/2000 | Mantell ...................... 347/15 |
| 6,089,765 | A | * | 7/2000 | Mori ........................... 400/61 |
| 6,115,132 | A |   | 9/2000 | Nakatsuma et al. ....... 358/1.14 |
| 6,433,882 | B1 | * | 8/2002 | Mori et al. ................ 358/1.13 |
| 6,624,909 | B1 |   | 9/2003 | Czyszczewski et al. ... 358/1.17 |

FOREIGN PATENT DOCUMENTS

JP              10-240469        9/1998

\* cited by examiner

*Primary Examiner*—Gabriel Garcia
(74) *Attorney, Agent, or Firm*—Fitzpatrick, Cella, Harper & Scinto

(57) ABSTRACT

The invention is featured by a configuration, for notifying the end of printing to the client in asynchronous manner for the print job that cannot be reserved in the server, of judging the writing capacity of the reservation job file of the server prior to the notification of the end of printing to the client apparatus, and, only in case the reservation is possible, the reservation job manager notifies the end of printing to the client apparatus but, in case the reservation is not possible, the print job that cannot be reserved is managed in a reservation waiting state.

21 Claims, 14 Drawing Sheets

FIG. 7

CLIENT REGISTRY

| |
|---|
| SERVER OPERATING STATUS (BITS) |
| SERVER NAME (CHR TRAIN) |
| SERVER IP ADDRESS (CHR TRAIN) |
| ⋮ |

FIG. 8

SERVER REGISTRY

| |
|---|
| LOG RESERVATION LOCATION (CHR TRAIN) |
| ERROR INFO (BITS) |
| LOG RESERVATION PERIOD (NUMERAL) |
| ⋮ |

FIG. 9

LIST STRUCTURE

| |
|---|
| INDEX (NUMERAL) |
| JOB ID (NUMERAL) |
| NAME OF RESERVATION JOB FILE (CHR TRAIN) |
| SIZE OF RESERVATION JOB (NUMERAL) |
| LOG RESERVATION PERIOD (NUMERAL) |
| USER NAME (CHR TRAIN) |
| DOCUMENT NAME (CHR TRAIN) |
| PRINTER NAME (CHR TRAIN) |
| DRIVER NAME (CHR TRAIN) |
| ADDRESS OF NEXT LIST |

FIG. 14

```
┌─────────────────────────────────────────────────┐
│              ☆ RE-PRINT GUI              [X]    │
├─────────────────────────────────────────────────┤
│                                                 │
│  SERVER :   [ SERVER-A              ▼]~1401    │
│                                                 │
│  RESERVATION JOB LIST :                         │
```

| JOB ID | USER | DOCUMENT | PRINTER | DRIVER |
|--------|--------|------------|-----------|----------|
| 000001 | USER-A | TEST-PRINT | PRINTER-A | DRIVER-A |
| 000002 | USER-A | TEST-PRINT | PRINTER-B | DRIVER-A |
| 000003 | USER-B | TEST-PRINT | PRINTER-A | DRIVER-A |
| 000004 | USER-B | TEST-PRINT | PRINTER-A | DRIVER-A |
| 000005 | USER-C | TEST-PRINT | PRINTER-C | DRIVER-B |
| 000006 | USER-C | TEST-PRINT | PRINTER-A | DRIVER-A |
| 000007 | USER-C | TEST-PRINT | PRINTER-A | DRIVER-A |

~1402

OUTPUT BY : [ PRINTER-A              ▼]~1403

☒ UPDATE RESERVATION LOCATION ~1404

[ RE-PRINT ]      [ CANCEL ]
     \                \
     1405             1406

FIG. 18

MEMORY MAP OF MEM MEDIUM

| DIRECTORY |
|---|
| 1ST DATA PROCESSING PROGRAM<br>PROGRAM CODES FOR FLOWCHART OF FIG. 11 |
| 2ND DATA PROCESSING PROGRAM<br>PROGRAM CODES FOR FLOWCHART OF FIG. 12 |
| 3RD DATA PROCESSING PROGRAM<br>PROGRAM CODES FOR FLOWCHART OF FIG. 13 |
| 4TH DATA PROCESSING PROGRAM<br>PROGRAM CODES FOR FLOWCHART OF FIG. 15 |
| 5TH DATA PROCESSING PROGRAM<br>PROGRAM CODES FOR FLOWCHART OF FIG. 16 |
| 6TH DATA PROCESSING PROGRAM<br>PROGRAM CODES FOR FLOWCHART OF FIG. 17 |
| |

# PRINT SERVER APPARATUS, PRINT JOB RESERVATION MANAGEMENT METHOD, RESERVATION JOB GENERATION METHOD AND MEMORY MEDIUM

This application is a division of application Ser. No. 09/676,091, filed Oct. 2, 2000 now U.S. Pat. No. 7,130,068.

BACKGROUND OF THE INVENTION

1. Field of the Invention

The present invention relates to a server apparatus and a client apparatus for managing print data and print job information outputted from plural clients connected to a network to a network printer connected to such network, a print job management system therefor, a method therefor and a memory medium therefor.

2. Related Background Art

In the conventional environment utilizing the network printer, it has not been popular to directly transmit the print data from the plural clients on the network to the network printer. This is because, if the network printer receives plural print data from the plural client apparatus, there increases the load in sequence control and reception process, leading to an increase in the cost of the network printer in order to respond to such load.

For this reason, there is often set a print server on the network, utilizing the operating system thereof. In such print job reservation system utilizing such print server, the printing operation is executed by transferring the print data from a client to the print server, reserving such print data in a specified area of the print server, at the same time managing, by the print server, the order of printing in the network printer designated as the output destination of the print data, and reading and transmitting the reserved print data to the network printer when the order of printing is reached.

In such case, the print server has to accept, for the network printer under the management thereof, the print data from plural clients on the network, so that the load of the print server inevitably increase with the increase in the number of the clients or the network printers. Therefore, in case the reservation medium (for example hard disk) for the print data in the print server becomes unavailable because of an error such as a deficiency in the memory capacity, it becomes impossible not only the reservation of the print data accepted from the client apparatus but also the transmission of the print data to the network printer. For this reason there has recently been conceived a system in which the print server only accepts print requests for the print jobs while the actual print data are retained by the clients, and the client apparatus directly transmits the print data to the network printer after a transmission permit is received from the print server.

In order to resolve the drawback that the printing process cannot be executed by the trouble in the print server, the Japanese Patent Application Laid-Open No. 10-240469 proposes a network print system and an information processing apparatus. In this system, however, since the print data retained in the client are deleted at the completion of the printing operation, it is not possible to reserve the print data, after normally completed printed process, in the server computer.

Therefore, there can be conceived a print job reservation management system provided with a server computer including print end notifying means for judging the available writing capacity of a memory medium of the server computer (assumed as a hard disk of the computer for the purpose of simplicity but composable by a detachable medium such as a mangetooptical disk) and notifying a client computer of print end only in case the data reservation is possible but maintaining an unreservable print job in a waiting state for reservation, a client computer including reserved job transmission means which does not delete the print data at the reception of information for print end from the server computer but transmits the print data and the print job information collectively as a reservation job to the server computer and deletes the reservation job at the completion of transmission, and reservation job management means for reserving the reservation job transmitted from the client computer in a designated directory, deleting periodically the reservation job after expiration of a designated reservation period, and notifying the print end notifying means of an increase in the available reservation capacity thereby enabling notification, for the reservation job that cannot be reserved on the server computer, of print end in asynchronous manner.

In such system, a print job for which the print end is informed is retained in the designated directory of the server computer for the designated period, while a print job that cannot be reserved on the server computer is reserved in the reservation waiting state on the client computer requesting the printing operation. However, the job in the reservation waiting state is reserved in the designated directory of the server computer as the print end is informed in asynchronous manner as soon as the reservation capacity on the server computer becomes available. As a result, there can be prevented a situation where the print end job cannot be reserved on the server computer because of the deficiency in the reservation capacity thereof.

Also in case of reprinting a reservation job reserved in the server computer, if the RAW data alone including the device information are reserved, the reprinting cannot be executed in another printer but is limited to a printer of the identical specification. Therefore, there can be conceived a print job reservation management system capable of reserving the RAW data and the EMF data collectively in a reservation job file thereby enabling reprinting of the reservation job according to the printer of destination. In addition, there has been a limitation that the reprinting can only be made on the same printer if the print data reserved in the reservation job file are RAW data.

SUMMARY OF THE INVENTION

The first object of the present invention is to judge the size of the print job data and the available capacity of the reservation directory on the server computer and to inform print end only in case the reservation is possible.

The second object of the present invention is to transmit print data and print job information collectively as a reservation job to the server computer in response to the information of print end therefrom, and to delete the reservation job at the completion of the transmission.

The third object of the present invention is to receive the reservation job transmitted from a client computer, to reserve the reservation job in a separately designated directory of the server computer, and to periodically delete the reservation job of which separately designated reservation period expires.

The fourth object of the present invention is to store the RAW data and the EMF data simultaneously in the reservation job file, thereby enabling reprinting with limitation of the destination.

The fifth object of the present invention is to select an arbitrary reservation job file reserved in the server computer, thereby enabling printing of the ordinary application level by directly transmitting the print data to a spooler or generating the print data by a printer driver through GDI, according to the print data (RAW or EMF) transmitted from the server.

The sixth object of the present invention is to re-reserve the RAW data, generated at the re-printing, as a new reservation job file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view showing the configuration of a registry of a client;

FIG. 8 is a view showing the configuration of a registry of a server;

FIG. 9 is a view showing the configuration of a list;

FIG. 14 is a view showing a re-print GUI of the present invention;

FIG. 18 is a view showing the memory map of a memory medium storing data processing programs readable by the server apparatus or the client apparatus of the present invention.

DESCRIPTION OF THE PREFERRED EMBODIMENTS

Figure 1:
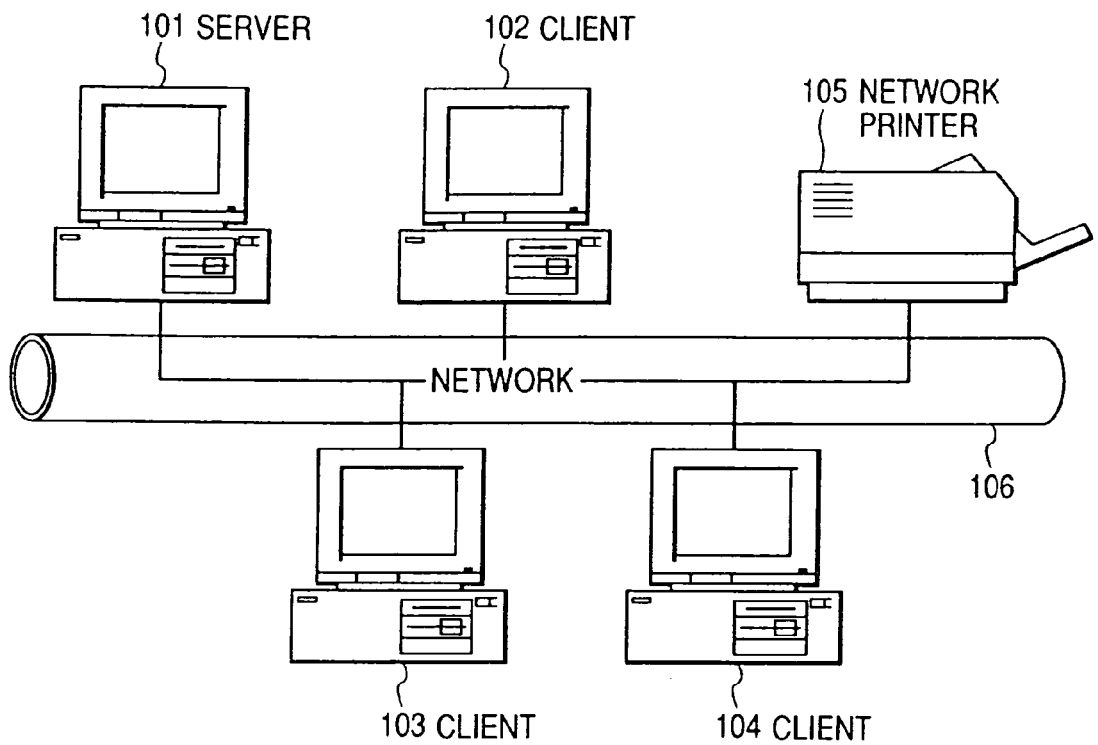
FIG. 1 is a view showing the configuration of a network system in which the print job reservation management system of the present invention is applied.

FIG. 1 is a block diagram showing the configuration of a printing system in which the print control apparatus of the present invention is applicable, particularly corresponding to a system for reservation management of the print jobs. In this embodiment, it is assumed that there are connected n client computers.

Referring to FIG. 1, client computers 102, 103, 104 are connected by network cables to a network 106, also capable of executing various programs such as application programs and are provided with a printer driver for preparing print data.

A server 101 is connected by a network cable to the network 106. The server 101 of the present embodiment is provided with a function of storing print job information from the client computers 102, 103, 104 as a summary file.

A network printer 105, being connected to the network 106 through a network interface, prints the print data transmitted from the client computer. A network 106 is connected to the client computers, server and network printer.

Figure 2:
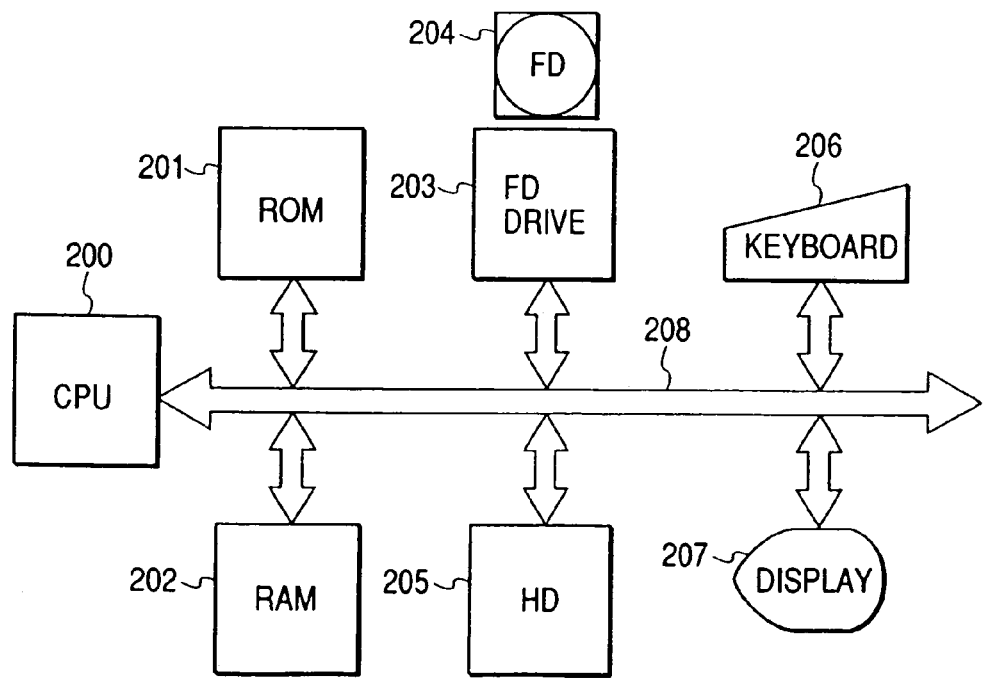
FIG. 2 is a block diagram showing the schematic configuration of a client computer in FIG. 1.

FIG. 2 is a block diagram showing the schematic configuration of the client computer 102 shown in FIG. 1. The client computer 102, 103 have a same configuration.

Referring to FIG. 2, a CPU 200 executes application programs, a printer driver program, an operating system (OS), a print job reservation management program etc. stored in a hard disk (HD) 205, and temporarily stores information, files etc. necessary for the execution of programs in a RAM 202. A ROM 201 stores programs such as a basic I/O program, and various data such as font data and template data to be used for text processing. A RAM 202 serves as a main memory and a work area of the CPU 200.

A floppy disk (FD) drive 203 allows to load a program etc. stored in a floppy disk 204 into the present computer system. A FD 204 stores a print job reservation management program and related data, to be explained in the present embodiment, and FIG. 4 stores the configuration of the stored content.

Figure 4:
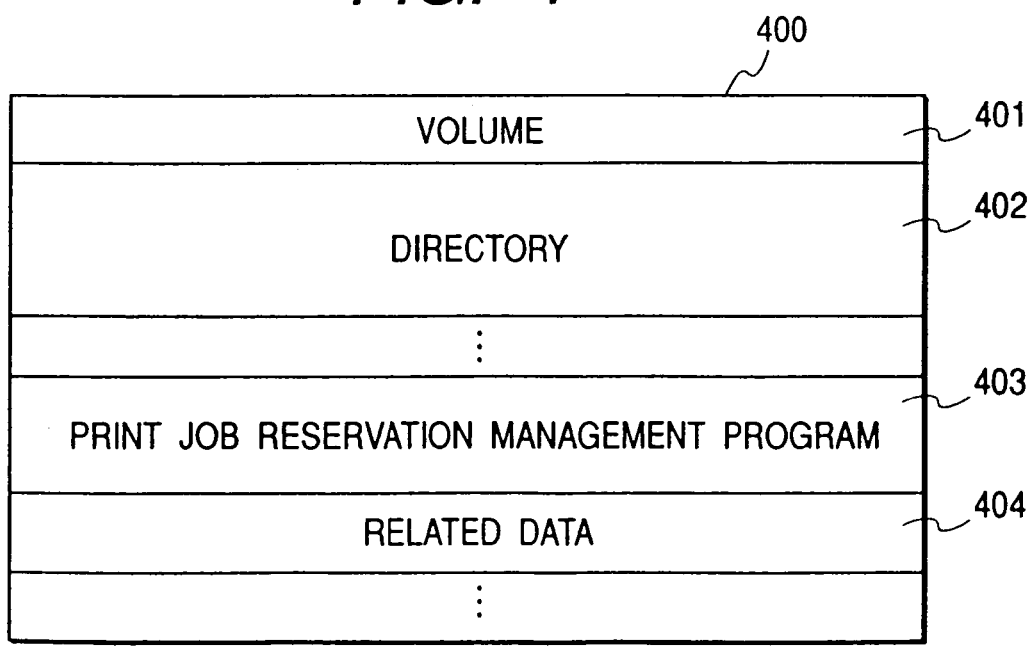
FIG. 4 is a memory map representing data inside the FD shown in FIG. 2.
Figure 5:
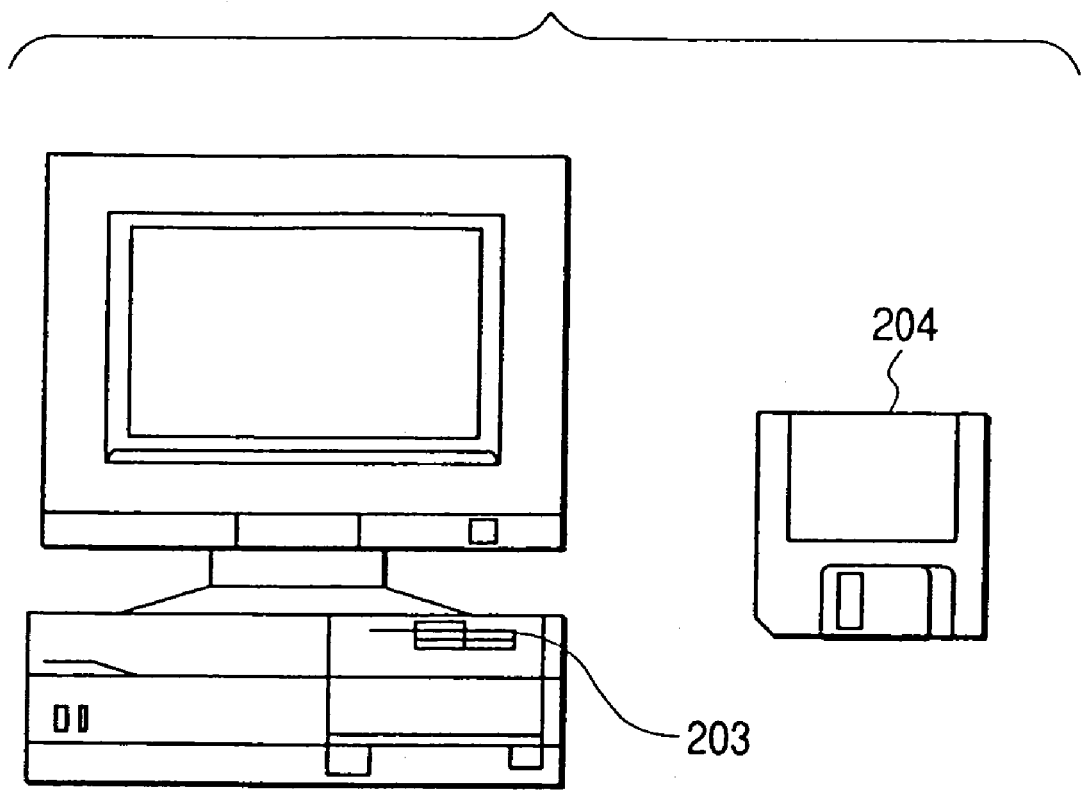
FIG. 5 is a view showing the relationship between the client computer shown in FIG. 1 and the FD shown in FIG. 2.

Referring to FIG. 4, there are shown a data content 400 of the FD 204, volume information 401 indicating the information of the data, directory information 402, a print job reservation management program 403 to be explained in the present embodiment, and related data 404 therefor. The print job reservation management program 403 is reduced to program codes according to flow charts of the network printer control sequence shown in FIGS. 15 to 20.

An HD 205 stores application programs, a printer driver program, an OS, a print job reservation management program, related programs etc. A keyboard 206 is used by the user for entering device control commands into the client computer. A display 207 displays the command entered from the keyboard 206 and the status of the printer. A system bus 208 executes the data flow in the client computer.

Figure 3:
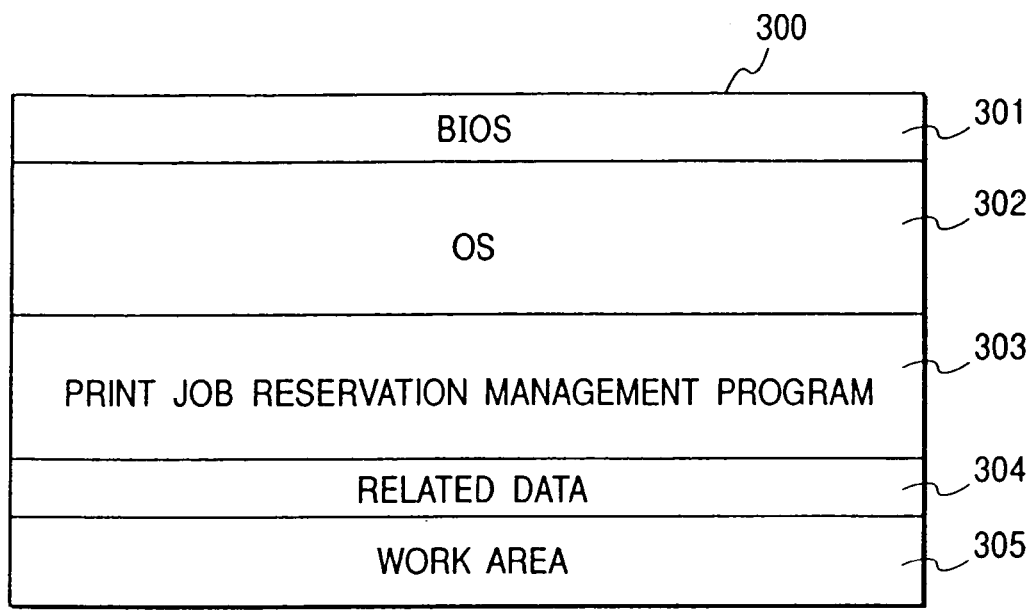
FIG. 3 is a memory map of a program developed in a RAM shown n FIG. 2 from a FD shown in FIG. 4.

FIG. 3 is a memory map in a state where the network printer control program is loaded in the RAM 202 and is rendered executable. In the present embodiment, there will be explained an example in which the print job reservation management program and related data are directly loaded from the FD 204 into the RAM 202 and executed therein, but they may also be loaded from the HD 205 to the RAM 202. Also the medium storing the print job reservation management program may be a CD-ROM or an IC card memory instead of FD. It is also possible to store the print job reservation management program in the ROM 201 as a part of the memory map and to execute such program directly by the CPU 200.

A basic I/O program area 301 stores a program having an IPL (initial program loading) function causing the OS to be read from the HD 205 into the RAM 202 and to be activated when the power supply of the present control apparatus is turned on. In areas 302, 303, 304 there are respectively developed an OS, a print job reservation management program, and related data. An area 305 serves as a work area for executing the network printer control program by the CPU 200.

Figure 6:
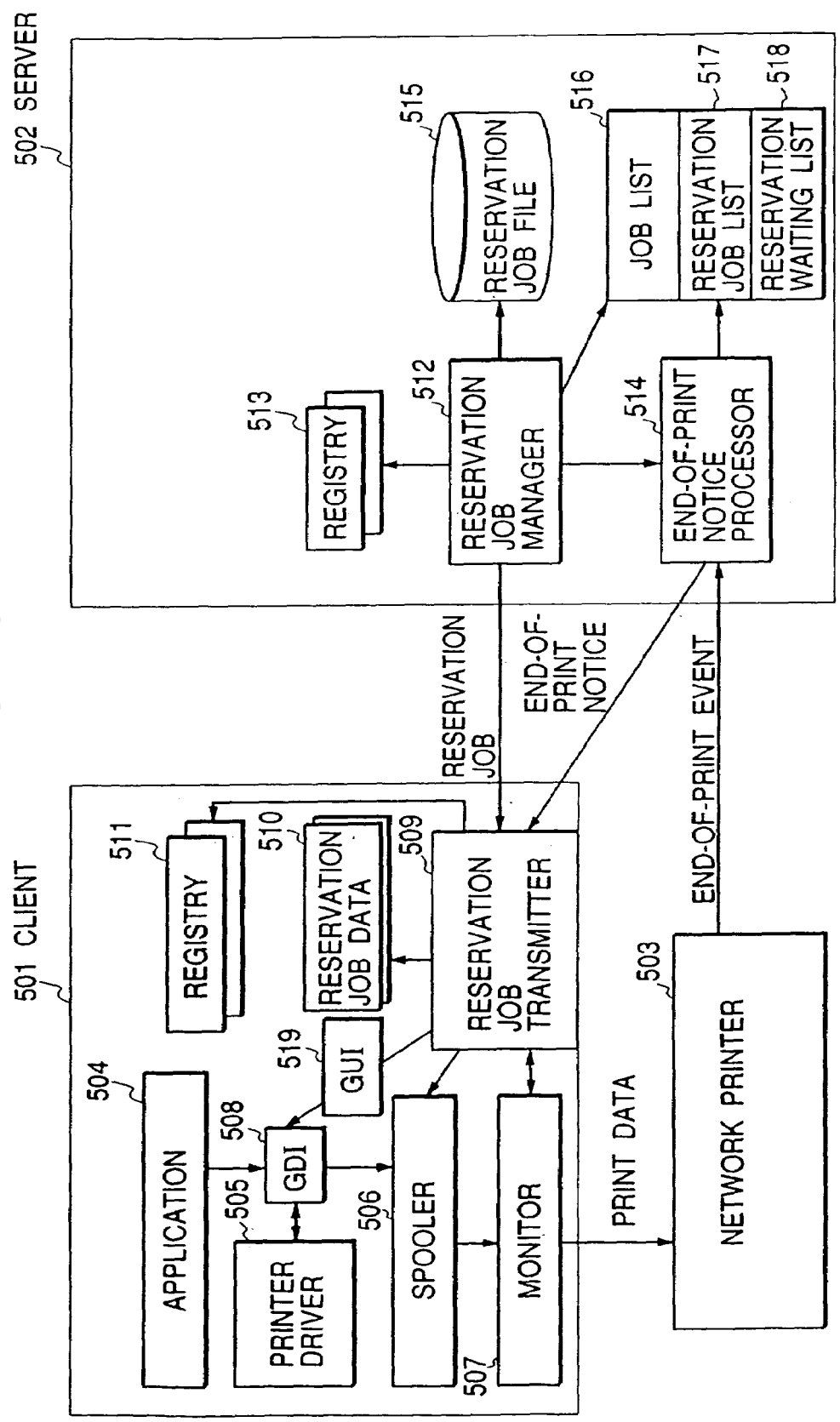
FIG. 6 is a view showing the configuration of software modules of a client computer and a server in an embodiment of the present invention.

FIG. 6 is a view showing the configuration of software modules or a print system in which the client computer and the server embodying the present invention are applicable. These modules can be supplied, for example, from the FD. In FIG. 6, there are shown a software module configuration 501 of a client computer, a software module configuration 502 of a server, and a network printer 503.

An application module 504 is used for preparing print data to be reserved by the print job reservation management system of the present invention. The application 504 prepares text data and outputs such data, in case of printing, as drawing data (GDI) to a GDI (graphic device interface) 508 constituting the drawing means of OSS. A printer driver 505 is incorporated and functions in the Windows OS (trade name) of Microsoft Corp., U.S.

There are also shown a printer spooler 506 in the Windows, a network printer control monitor 507, a print reservation job transmitting module 509 for transmitting reservation job data 510, prepared collectively from print data (RAW and EMF in the present invention as will be explained later) and print job information, to the server, and a registry 511 to be registered in the Windows system and provided with a directory for retaining the name of a server of destination of transmission or the reservation job data.

In case of printing with the application 504, the text data are outputted as a GDI function, constituting drawing data, to the GDI 508, which converts such GDI function into drawing commands executable by the driver and called a DDI (device driver interface) function. The printer driver 505, receiving the DDI function, converts it into a printer language (page description language) interpretable by the network printer 503 for executing the printing. In the Windows OS, there can be executed spooling by a file of a device-independent intermediate data format called EMF (enhanced meta file). The EMF data reserve the drawing content in binary format, based on the GDI function issued by the application. Upon completion of spooling, the drawing content temporarily stored in an EMF spooler, represented by the EMF data, is outputted as the GDI function to the GDI 508. Also the print data in the format of a page description language, generated by the printer driver 505, are called RAW data.

A reservation job management module 512 featuring the present invention serves to receive the reservation job data transmitted from the print reservation job transmitter 509 of the client computer by RPC (remote procedure call) or to transmit the designated print data.

A server registry 513 registered in the Windows system controls the function of the print reservation job manager 512 according to set information such as the destination or period of reservation of the reservation job file.

An end-of-print notice processor 514 receives an end-of-print event for the print data, transmitted from the monitor 507 of the client 102, from the network printer 503, and, after judging whether the reservation is possible, sends an end-of-print notice to the print reservation job transmitter 509 by RPC.

There are also shown a file 515 storing the reservation job, a job list 516, a reservation job list 517, a list structure member 518 to be used as a reservation waiting job list, and a re-print GUI (re-print GUI providing module) 519 for providing a user interface for re-printing an arbitrary reservation job from the client. These modules constitute the print job reservation management system of the present invention, and are supplied from a memory medium which is the FD 204 in the present embodiment.

FIG. 7 shows the data structure of the registry 511 of the client 102 shown in FIG. 6, and shows a case where the registry is constituted by a server function information, a server name, a server IP address etc.

FIG. 8 shows the data structure of the registry 511 of the server 101 shown in FIG. 6, and shows a case where the registry is constituted by a log reservation destination, an error information, a log reservation period etc.

FIG. 9 shows the data structure of the list structure of the server 101 shown in FIG. 6, and shows a case where it is constituted by an index, a job ID, a reservation job file name, a reservation job size, a log reservation period, a user name, a document name, a printer name, a driver name, a next list address etc.

In the following there will be explained a print job reservation management process in case the printing is executed in the network printer 105 from the client computer 102 in the above-described print system.

In the present embodiment, explanation will be made on the print system based on an imaginary printer server system. The imaginary printer server system of the configuration shown in FIG. 6 executes the process in the following manner. When the printing is started from the application 504 on the client PC 501 (102), the present print control program accesses the EMF data which spool the drawing content issued from the application 504 and generates a copy in the reservation job data 510. Also the RAW data, which are a printer control language generated by the printer driver 505 based on the print command from the GDI 508, are reserved also as print data in correlation, by an identifier, with the already reserved EMF data. When the reservation of the print job (EMF data+RAW data) is completed, the client 102 transmits, to the print server 101 (server 502), print request information (not including print data) consisting of the name of print data, the host name, the print request time, the printer name at the print output destination etc. the print server 101 executes order management of the print requests for the printer at each print output destination, and, notifies a print permission to a client issuing the print request information or a next print order, when the network printer no longer has the print job awaiting the printing, namely the print job in execution. The print permission is constituted by the name of print data to be printed, the request time etc.

Upon receiving the print instruction from the server 502, the client searches the permitted print job from the reservation job data 510 (or spooler 506) based on the information in the print permission. Then the RAW print data reserved in the reservation job data 510 are read, and the monitor 507 transmits the read print data to the destination network printer 503 by LPR, whereby the printing operation is executed. As explained in the foregoing, the print server manages the order of printing while the client spools the print data and the client itself sends the print data to the network printer when the order of printing is reached, whereby the number of communications of the print data on the network is reduced to alleviate the load of the network. Also as the print server only manages the order of printing, there is not required a large spooler, and, because of the lighter load of processing, one of the clients may be used as an imaginary print server instead of providing an exclusive print server on the network (LAN).

The end-of-print notice processor 514 awaits the end-of-output event from the network printer 503, then, upon receiving the event, judges the remaining capacity of the reservation job directory set in the registry 513, and, if the reservation is possible, sends an end-of-print notice to the reservation job transmitter 509.

In response to the notice, the reservation job transmitter prepares a reservation job consisting of the print data (both EMF data and RAW data) and the print job information, and transmits the reservation job to the reservation job manager 512. The reservation job manager 512, receiving the reservation job, stores it as a reservation job file in a directory set in the registry 513.

In case the end-of-print notice processor 514 identifies that the reservation job cannot be reserved, the job is retained in a reservation waiting state without the issuance of the end notice therefor. For the jobs in the reservation waiting state, at the timing of periodic deletion of the reservation job exceeding the reservation period by the reservation job manager 512, an increase in the remaining capacity of the reservation directory is informed to the end-of-print notice processor 514, and a reservable job is identified from the jobs in the reservation waiting state and an end-of-print notice is given to the reservation job transmitter 509. As a result, the job in the reservation waiting state is also reserved as a reservation job file, like the job for which the printing is completed.

Also in case of re-printing of the reservation job file, the client 501 request a list of currently reserved jobs to the reservation job manager 512, which, in response, returns the content of the reservation job list 517.

Receiving the list, the reservation job transmitter 509 causes the display unit to display the list of the print jobs reserved on the re-print GUI 519, thereby requesting that the user selects an arbitrary reservation job and a destination printer. The present print control program designates the ID of the job and the destination printer, selected by the user, and request again the print data stored in the reservation job file, to the reservation job manager 512.

In response, the reservation job manager 512 returns the print data, corresponding to the designated printer, from the designated reservation job file. The re-print GUI 519, receiving the print data through the reservation job transmitter 509, executes printing either through GDI or by sending the print data directly to the spooler, according to the kind (RAW or EMF) of the print data. The print data generated as a result of printing are formed by the reservation job transmitter 509 as a new reservation job file 510 constituted by RAW data and EMF data and are reserved in the server according to the aforementioned procedure.

Thus, the present print job reservation management system can reserve the print jobs, printed from the plural clients 102 to 104, as reservation jobs in a designated location on the server (reservation job file 515 in FIG. 6).

Figure 10:
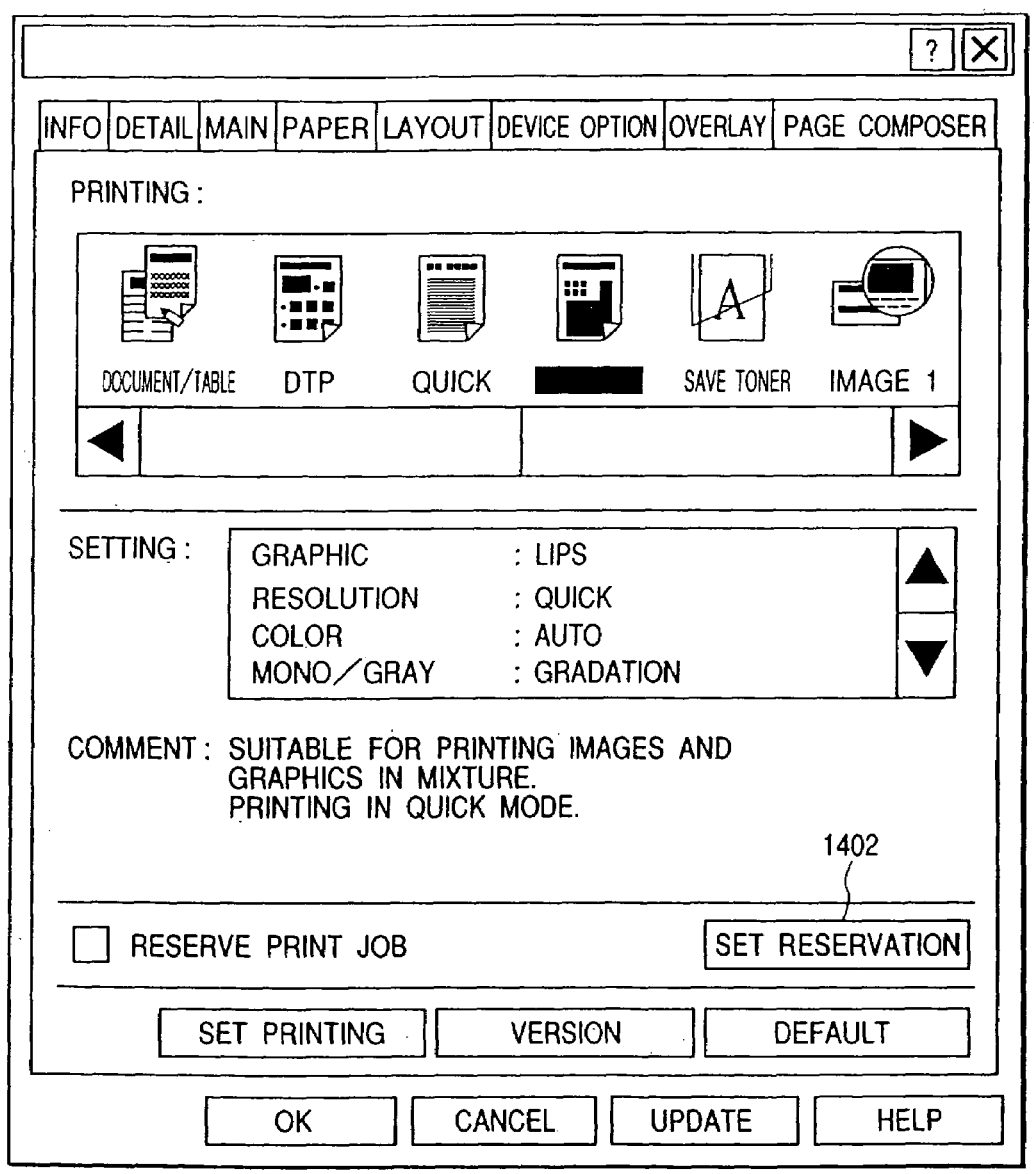
FIG. 10 is a view showing an example of the print setting image displayed on a display device of the client apparatus shown in FIG. 1.

The reservation process for the print job need not be executed for all the print jobs. Therefore, at the print instruction by the user on the client, the user is caused to designate whether to reserve the print job after printing or to delete it after printing. Now reference is made to FIG. 10 for explaining a property, image of the printer driver displayed on the client. In the printer driver installed in the client, the user can set the print conditions utilizing an image shown in FIG. 10. In this user interface, the user can set the print resolution, gradation, graphic mode, sheet size, print layout, sheet direction, stamping etc.

Also a "print job reservation" check box 1401, if checked, causes the client to reserve the print job in the server, after the end of printing. In case of printing without checking in the check box 1401, the print data reserved in the client are deleted without uploading in the server, after the printing in the printer.

Also a "reservation setting" button 1402 enables detailed setting for the reservation of the print job in the server. The reservation setting includes the reservation period, which is the period of reservation of the print job in the server, and the number of printing times. The number of printing times indicates an operation of deleting the print job reserved in the server after printings of a certain number of times, and such print job is reserved in the server until it is printed for such number of times.

Also as the data of a device-independent EMF format and those of a device-dependent RAW format are reserved and either is selected according to the destination printer at the re-printing operation, it is rendered possible to output the reserved job to a destination different from that in the original operation, and, in case the destinations in both operations are same, there can be attained a re-printing operation with an increased throughput of printing. The present embodiment has been explained with the Windows system, but the present invention is not limited to such example and can be constructed on other operating systems such as OS/2.

Figure 11:
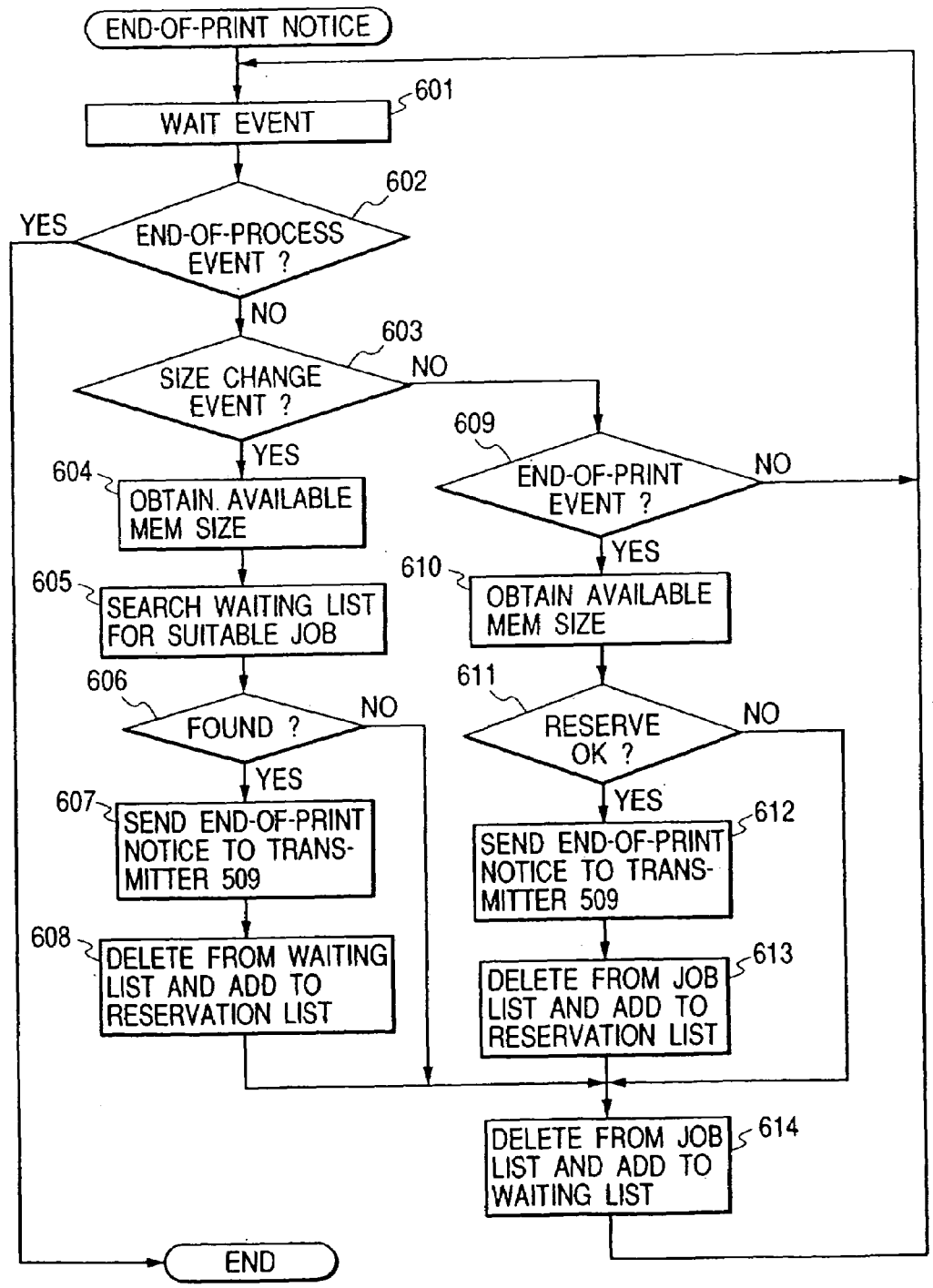
FIG. 11 is a flow chart showing the process flow of a print end notification unit of the present invention.

FIG. 11 is a flow chart showing an example of a first data processing sequence in the print system of the present invention, corresponding to the end-of-print notifying process by the end-of-print notice processor 514 shown in FIG. 6.

In summary, this sequence awaits an end-of-output event from the network printer 503, then judges whether the reservation as a reservation job is possible and notifying the print end to the reservation job transmitter 509. The end-of-print notice processor is provided as an event-driven permanent service, executing process by various events from the modules of the present invention, the network printer or the operating system.

At first, a step S601 waits for an end-of-output event from the network printer, a change event for the reservation capacity, or an end event of the present invention. When an event occurs, a step S602 discriminates whether it is an end event. If it is an end event from the operating system, the sequence is terminated after the internal memory is released.

If the event is not an end event, a step S603 discriminates whether it is an event for a change in the remaining capacity of the reservation directory. If so, a step S604 acquires a capacity for reservation in the reservation directory designated by the registry 513.

Then a step S605 compares sizes of the jobs, from the top of the reservation waiting list 518, with the reservable capacity, thereby searching a reservable job. Then a step S606 discriminates whether a reservation job capable of being reserved, and, if not, the sequence returns to the step S601 for awaiting a next event.

On the other hand, if the step S606 identifies a reservable job, a step S607 sends an end-of-print notice for such job by RPC to the reservation job transmitter 509. Then a step S608 deletes such job from the reservation waiting list 518 and adds it to the reservation job list 517. Then the sequence returns to the step S601 for awaiting a next event.

On the other hand, if the step S603 identifies that the event is not an event for capacity change, a step S609 discriminates whether it is an end-of-print event. If not, the sequence returns to the step S601 for awaiting a next event. If the step S609 identifies an end-of-print event from the network printer, a step S610 acquires a capacity for reservation in the reservation directory designated by the registry 513.

Then a step S611 compares the size of the print job with the remaining capacity, and, if the reservation is possible, a step S612 sends an end-of-print notice for such job by RPC to the reservation job transmitter 509.

Then a step S613 deletes such job from the reservation waiting list 516 and adds it to the reservation job list 517. Then the sequence returns to the step S601 for awaiting a next event.

On the other hand, if the 611 identifies that the reservation is not possible, a step S614 deletes the job from the print job list 516 and adds it to the reservation waiting list 518. Then the sequence returns to the step S601 for awaiting a next event.

The end-of-print notice can be given only to the jobs reservable as the reservation jobs by the repetition of the above-described steps.

Figure 12:
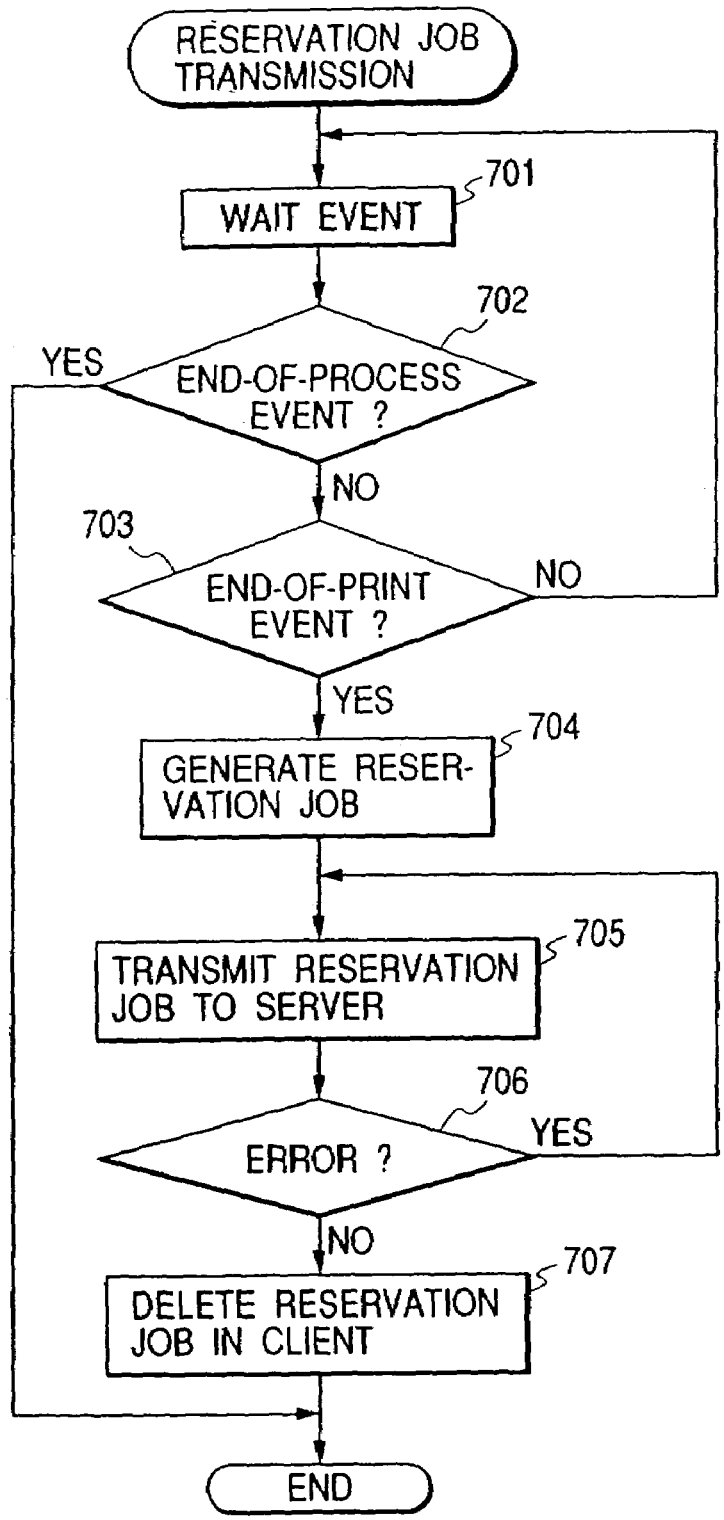
FIG. 12 is a flow chart showing the process flow of a reservation job transmission unit of the present invention.

FIG. 12 is a flow chart showing an example of a second data processing sequence in the print system of the present invention, corresponding to the reservation job transmitting process by the reservation job transmitter 509 shown in FIG. 6.

In summary, this sequence prepares the reservation job from the print job data (RAW data) prepared in the printing process of the application 504 on the client PC 102 and the print job information. In this operation, there can be acquired the device-independent EMF data prior to the interpretation of the print data into the RAW data by the driver, by rendering effective the metafile spooling function in the system spooler. The EMF data, prepared in the aforementioned EMF spooler (not shown), are copied by the monitor 507 in another file (with extender EMF) having the job ID as the file name. Then, after confirmation of the proper functioning state of the server 502, the reservation job consisting of the print job data including the EMF data and the print job information is transmitted to the reservation job manager of the server. If the transmission is not possible because of any trouble in the server, the reservation job is retained as the reservation job file in the client 501. The flow chart shows a process of transferring the retained reservation job file when the server is thereafter restored or when the capacity of the destination for reservation is secured. The reservation job transmitter is provided as an event-driven permanent service executing the process by various events from the modules of the present invention or from the operating system.

At first, a step S701 waits for an end-of-output event or an end event, and, when an event occurs, a step S702 discriminates whether it is an end event. If it is an end event from the operating system, the sequence is terminated after the internal memory is released.

If the event is not an end event, a step S703 discriminates whether it is an end-of-print event, and, if not, the sequence returns to the step S701 for awaiting a next event.

On the other hand, if the step S703 identifies an end-of-print event, a step S704 prepares a reservation job file from the print data consisting of the EMF data and the RAW data and from the print job information, utilizing the job ID reserved in the monitor 507 as the file name. The file name is formed by changing the job ID into a character train (with extender SPL).

Then a step S705 transfers the prepared reservation job file to the server 511 designated by the registry 511. Then a step S706 discriminates whether the transmission has been successful in proper manner, and, if the transmission is terminated by an error, the step S705 repeats the transfer. This procedure is repeated until the transmission is successfully completed.

On the other hand, if the step S706 identifies a proper transfer, a step S707 deletes the reservation job file constituting the source of transmission, or the print data and the print job information used in preparing the reservation job file from the internal memory or the local disk. Thereafter the sequence returns to the step S701 for awaiting a next event.

Thus the reservation job file consisting of the print job data and the print job information of a job of which the printing is completed can be transmitted by the repetition of the above-described steps.

Figure 13:
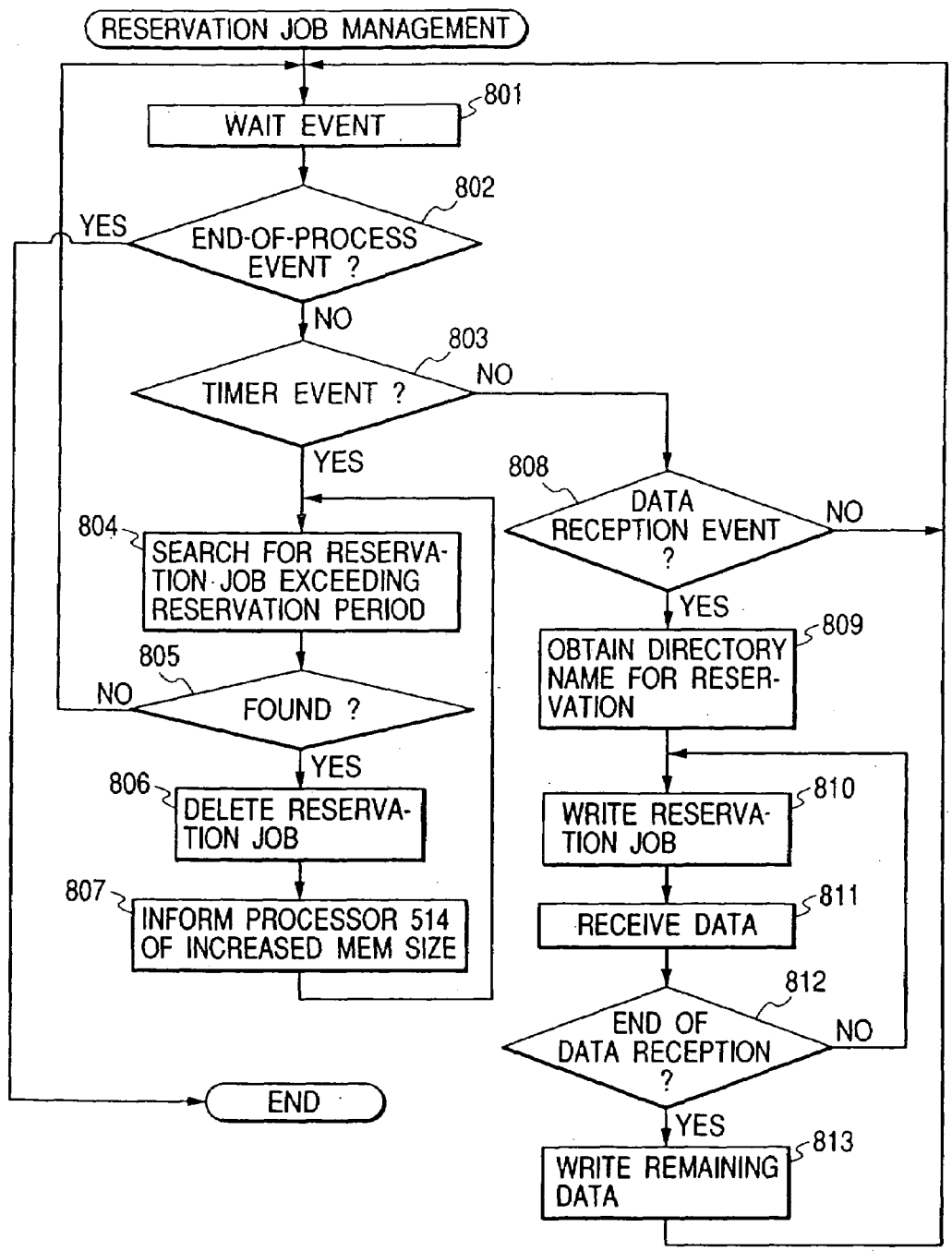
FIG. 13 is a flow chart showing the process flow of a reservation job management unit of the present invention.

FIG. 13 is a flow chart showing an example of a third data processing sequence in the print system of the present invention, corresponding to the reservation job management process by the reservation job manager 512 shown in FIG. 6.

In summary, this sequence reserves the reservation job transmitted from the reservation job transmitter 512 of the client 501 as a reservation job file in a designated directory. The reservation job manager is provided as an event-driven permanent service, executing process by various events from the modules of the present invention or the operating system.

At first, a step S801 waits for a reservation job reception event, a timer event or an end event, and, when an event occurs, a step S802 discriminates whether it is an end event. If it is an end event from the operating system, the sequence is terminated after the internal memory is released.

If the event is not an end event, a step S803 discriminates whether it is a timer event notified at a constant interval. If so, a step S804 searches a reservation job file, of which the reservation period designated by the registry 513 is exceeded.

Then a step S605 discriminates whether a reservation job of which the reservation period is exceeded is found, and, if not found, the sequence returns to the step S801 for awaiting a next event.

On the other hand, if the step S805 identifies a reservation job file of which the reservation period is exceeded, a step S806 deletes the reservation job file. Then a step S807 notifies the end-of-print notice processor 514 of an increase in the remaining capacity of the directory storing the reservation job.

In response, the end-of-print notice processor 514 finds an appropriate reservation job from the reservation waiting job list 518 as explained in the foregoing and notifies the print end to the reservation job transmitter 509 of the client 102. As a result, the reservation job is transferred and a reception event is sent in the step S801. The above-described process is repeated for the number of reservation job files found in the search of the step S804. Then the sequence returns to the step S801 for awaiting a next event.

On the other hand, if the step S803 identifies that the event is not a timer event, a step S808 discriminates whether it is a reception event. If not, the sequence returns to the step S801 for awaiting a next event.

On the other hand, if the step S808 identifies that the event is a reception event, a step S809 acquires the name of the reservation directory designated by the registry 513. Then a step S810 prepares a file of a name same as that of the reservation job file in the reservation directory, and writes the reservation job file therein.

Then a step S811 receives next reception data. A step S812 discriminates whether the reception data have ended, and, if not, namely if the transmission is to be continued, the sequence returns to the step S810 for writing the received data in the reservation job file prepared in the foregoing.

On the other hand, if the step S812 identifies that the reception data have ended, a step S813 writes the final reception data that have not been written into the file. Thereafter the sequence returns to the step S801 for awaiting a next event.

Thus, the reservation job received by the reservation job manager 512 from the client 102 can be stored in the designated location, by the repetition of the above-described steps.

The above-described embodiment allows the server apparatus to collectively manage only the jobs for which the printing has been completed, as reservation jobs, and also allows the client apparatus to reserve the print jobs instead of the server in case of a failure therein. Also, at an increase in the reservation capacity of the server, the reservation job can be automatically uploaded from the client apparatus, whereby the load of the user ion executing the data transfer on the client apparatus can be alleviated.

FIG. 14 shows a re-print GUI (graphical user interface) provided and activated by the reservation job transmitter of the present invention.

The re-print GUI consists of input control, selection control and check control as illustrated. The name of the server computer for reserving the reservation job is entered in the reservation server name, and the reservation job list displays the content of the reservation list stored in the reservation server. The output printer name lists the printers available to the client computer, and the printer having attribute same as that of the job selected in the above-mentioned reservation job list is automatically current displayed. In the absence of the printer having the same attribute, there is not executed automatic adjustment and the current display is not altered.

If "update reservation location" is checked, the content of such checking is transferred to the reservation job manager to be explained later, whereby the current reservation job file is deleted after the extraction of the print data and updated with the reservation job file reserved after the re-printing.

Figure 15:
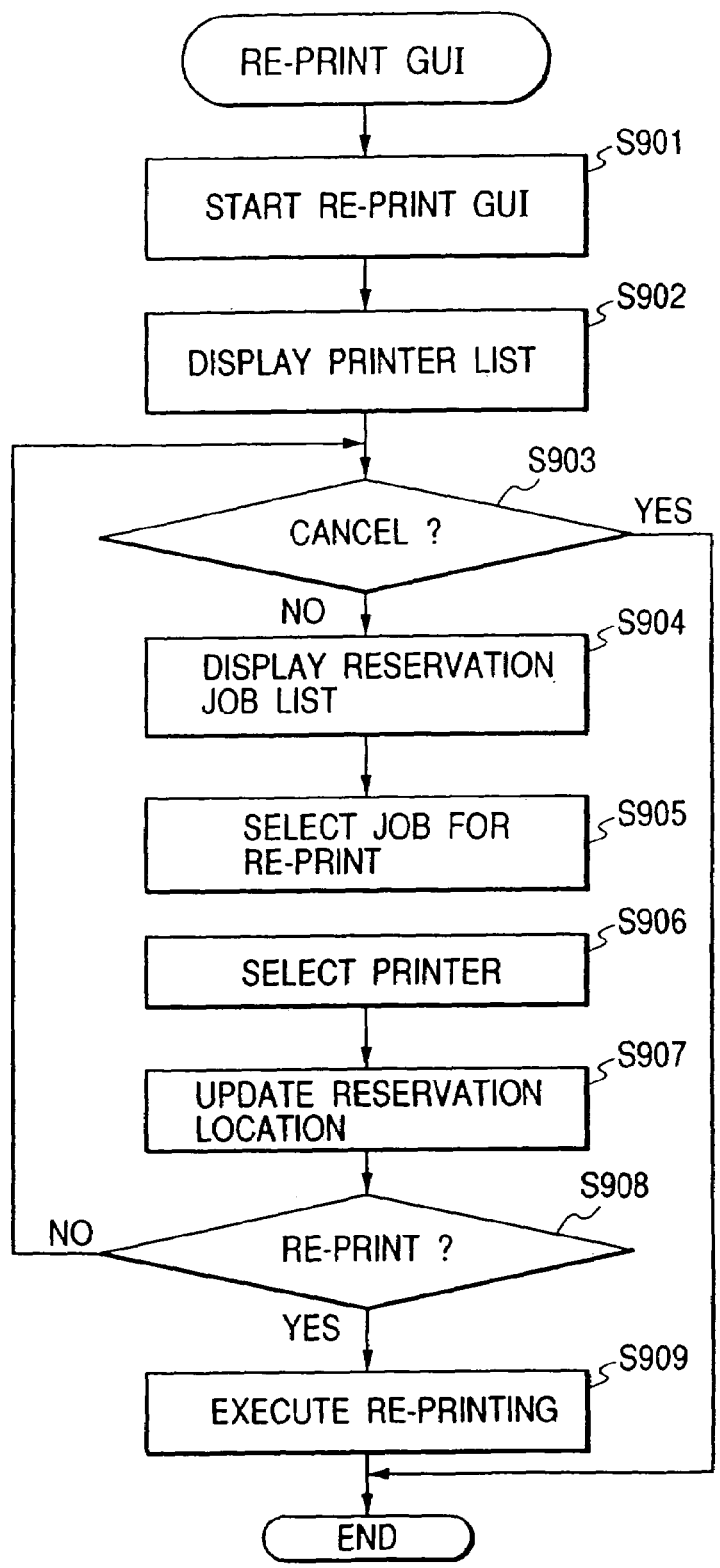
FIG. 15 is a flow chart showing the flowing of the re-print GUI of the present invention.

FIG. 15 is a flow chart showing an example of a fourth data processing sequence in the print system of the present invention, and requesting the setting of re-printing by the user through the GUI provided by the re-print GUI providing module 519 (hereinafter called re-print GUI module) shown in FIG. 6.

In a step S901, the re-print GUI module 519 activates the re-print GUI shown in FIG. 14. Then, in a step S902, the reservation job transmitter 509 acquires the printer list (EnumPrinters 0) available on the client computer, and adds it to the list control of the output printer names.

In a step S903, the re-print GUI module 519 discriminates whether a cancel button 1406 has been depressed. If the cancellation is instructed, the re-print GUI is terminated, but, if the cancellation is not instructed, the process is continued.

In a step S904, the re-print GUI module 519 requests the reservation job list to the reservation job manager of the reservation server 1401 designated by the user in the GUI shown in FIG. 14, utilizing RPC (remote procedure call). The reservation job list thus acquired is added to and displayed on the reservation job list control.

In a step S905, the re-print GUI module 519 judges a job to be reprinted, selected by the user from the reservation jobs displayed in the reservation job list 1402. Then, in a step S906, the re-print GUI module 519 judges the printer selected by the user for the actual output from the output printer list 1403 of the pull-down window. Such judgment can be achieved by judging the candidate area clicked by a pointing device such as a mouse.

In a step S907, the re-print GUI module 519 discriminates whether a check box 1404, indicating whether the location of reservation is updated by the user, is checked. If the updating of the location of reservation is selected, the selected reservation job is deleted and is replaced by a new reservation job reserved after the re-printing.

Then, in a step S908, the re-print GUI module 519 discriminates whether a re-print button 1405 is depressed. If it is depressed by the user, a step S909 executes a re-printing process shown in FIG. 15, based on the reservation job ID, the name of the printer driver of the output printer and the reservation job selected in the foregoing process. The process is terminated by the depression either of the re-print button 1405 or of the cancel button.

The process explained in the foregoing allows to activate the re-printing process of an arbitrary reservation job from the re-print GUI.

Figure 16:
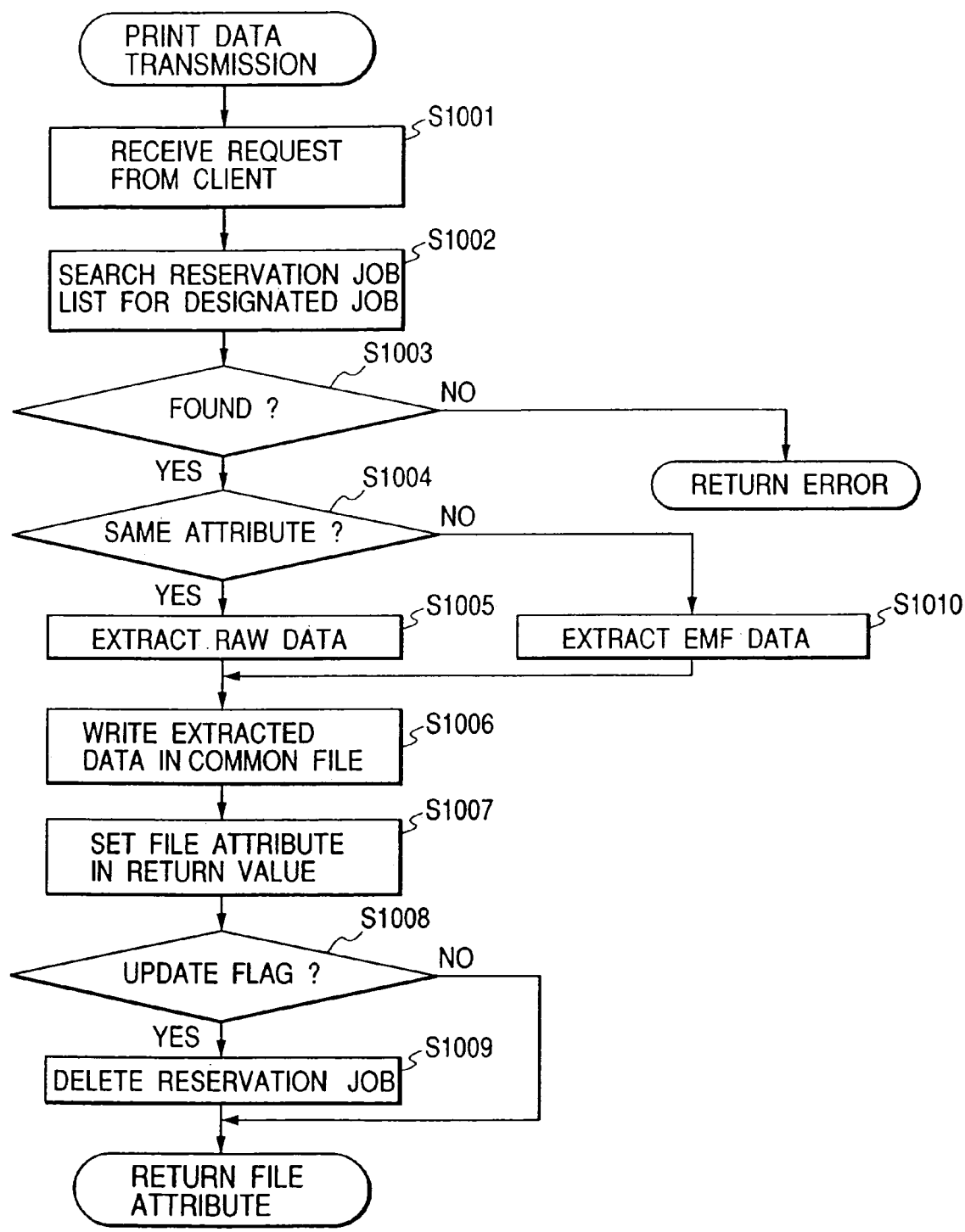
FIG. 16 is a flow chart showing the flow of a re-print process of the reservation job transmission unit of the present invention.

FIG. 16 is a flow chart showing an example of a fifth data processing sequence in the print system of the present invention, and representing the process in the reservation job manager 512 in case the re-printing is executed.

In a step S1001, the reservation job manager 512 receives, through the re-print GUI 519 and from the reservation job transmitter, a request for extracting the print data (common file name receiving print data, job ID, printer driver name and update flag) by RPC.

In a step S1002, the reservation job manager 512 searches the reservation job information from the reservation job list, based on the job ID received in the step S1001. If the search identifies that the designated reservation job is not registered in the list, an error is returned to the calling source.

If the search identifies that the designated reservation job is registered, the reservation job manager 512 in a step S1004 compares the printer driver name stored in the reservation job list with the printer driver name of the output destination. If the comparison identifies different models, namely different attributes, the reservation job manger 512 in a step S1010 extract the EMF data only from the reservation job file.

On the other hand, if the step S1004 identifies a same model, namely a same attribute, the reservation job manager 512 in a 1005 extracts the RAW data only. It is thus rendered possible to avoid wasted data transfer.

In a step S1006, the reservation job manager 512 writes the extracted print data in the common file for print data writing, transferred in the step S1001. Then, in a step S1001, the reservation job manager 512 writes the kind (RAW or EMF) of the print data in a return value to be returned to the calling source. The writing of the print data to be transferred to the client is completed at this point.

In a step S1008, the reservation job manager 512 discriminates whether an update flag is set, and, if not, the sequence is immediately terminated, but, if set, a step S1009 deletes the reservation job file to be used as the basis of the re-printing. Such deletion eliminates the original reservation job file, but a new reservation job file is generated by the re-printing, so that the reservation job file is updated.

Figure 17:
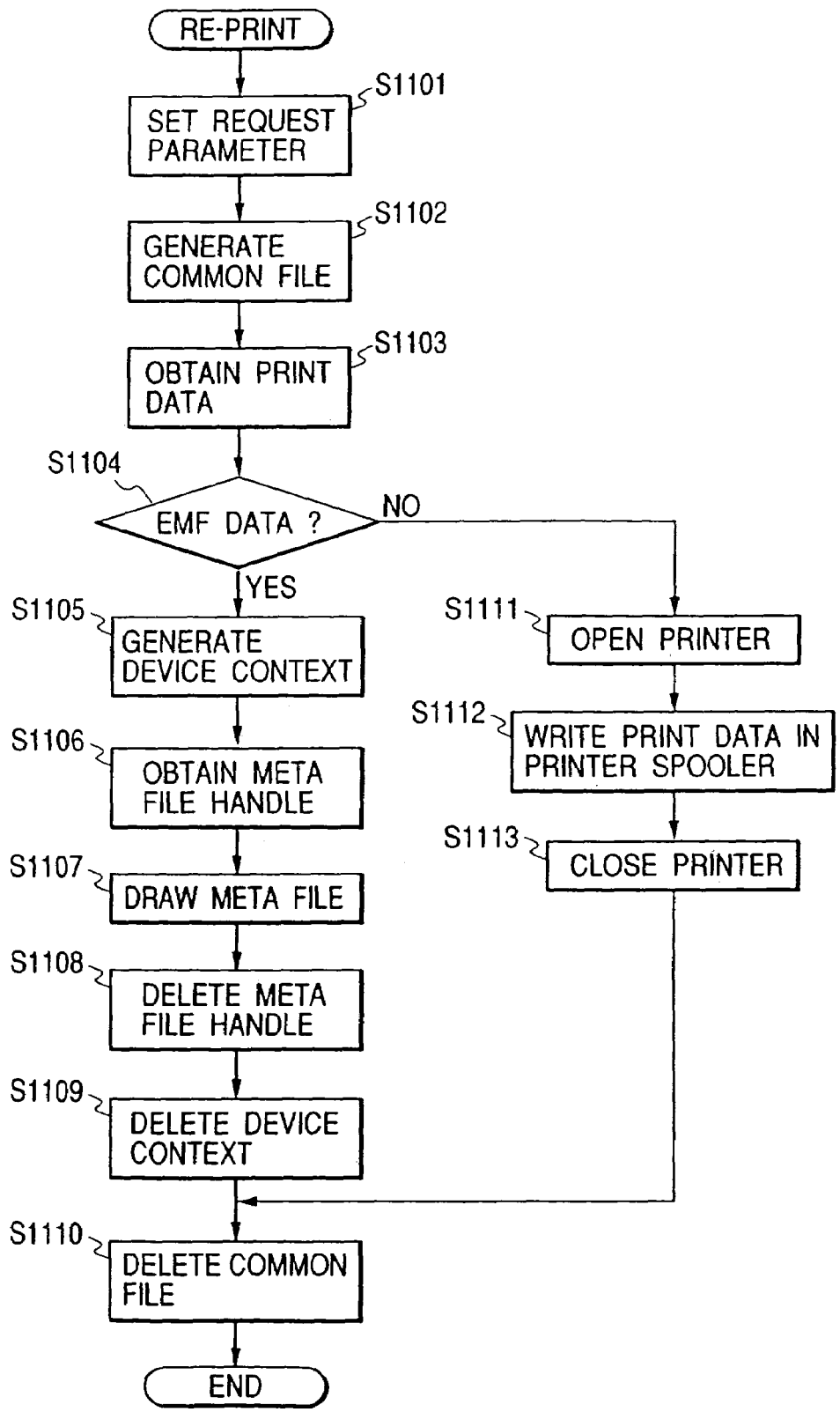
FIG. 17 is a flow chart showing the flow of a print data extraction process in the reservation job management unit of the present invention.

FIG. 17 is a flow chart showing an example of a sixth data processing sequence in the print system of the present invention, and representing the process when the re-printing is executed.

A step S1101 sets the items designated by the re-print GUI 519 as RPC parameters. Then a step S1102 prepares a common file for receiving the print data. As a result of print data request by RPC, the print data are written into the common file.

A step S1103 executes the process shown by the flow chart in FIG. 15, whereby the reservation job transmitter 509 receives the print data. A step S1104 discriminates the attribute of the print data stored in the return value, and, if the received print data are identified as EMF data, a step S1105 prepares a device context of the printing device (printer) according to the procedure of printing from the ordinary application. The device context is a file including the attribute of the drawing sheet, the ability and attribute of the printer, and the printing can be realized by drawing in a metafile handle prepared from such device context.

A step S1106 acquires the metafile handle from the acquired EMF data and the aforementioned device context. Then a step S1107 draws the EMF file. In EMF drawing, the GDI 508 generates the print data in cooperation with the printer driver, by calling an exclusive GDI function (PlayMetafile 0).

A step S1108 deletes the metafile handle. Then a step S1109 deletes the device context, thereby notifying the GDI of the end of printing. The generated print data are sent to the spooler at this point, thereby executing the ordinary printing. If the step S1104 identifies RAW data, a step S1111 opens the printer of destination and causes the spooler to directly transmit the print data.

A step S1112 writes the print data received from the server directly into the printer, whereby the reserved print data are transferred without change to the printer. When all the print data are transferred, a step S1113 closes the printer. Then a step S1110 deletes the common file which has received the print data.

The above-described procedure allows to extract the print data from the reservation jobs in the reservation server and to re-output the print data to the designated printer.

In the following there will be explained, with reference to a memory map shown in FIG. 18, the configuration of the data processing program readable by the print system, in which the server apparatus and the client apparatus of the present invention are applicable. FIG. 18 shows the memory map of a memory medium storing various data processing programs readable by the server apparatus and the client apparatus of the present invention.

Though not illustrated, there may also be stored information for managing the programs stored in the memory medium, such as version information or the producer of programs, and there may also be stored information dependent on the operating system of the program reading side, such as an icon for identifying the program. Also the data belonging to such programs are also managed by the aforementioned directory. Furthermore, there may also be stored a program for installing various programs into the computer, or a thawing program in case the program to be installed is compressed.

The functions shown in FIGS. 11 to 13 and 15 to 17 may be attained by a host computer, according to a program to be installed from the exterior. Thus the present invention is also applicable in a case where a group of information including the programs is supplied to the output apparatus from a memory medium such as a CD-ROM, a flush memory or an FD, or from an external memory medium through the network.

Also the objects of the present invention can naturally be attained in a case where the program codes of a software realizing the functions of the aforementioned embodiments are supplied to a computer of a system or an apparatus and the functions of the aforementioned embodiments are realized by reading and executing the program codes by the computer (CPU or MPU) of the above-mentioned system or apparatus. In such case the program codes themselves read from the memory medium realize the novel functions of the present invention, and the program codes storing such program codes constitutes the present invention.

The memory medium for supplying such program codes can be, for example, a floppy disk, a hard disk, an optical disk, a magnetooptical disk, a CD-ROM, a CD-R, a CD-RW, a DVD, a magnetic tape, a non-volatile memory card, a ROM or an EEPROM.

The present invention also includes such program codes not only in a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments. The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, the present invention allows the server apparatus to collectively manage only the jobs for which the printing has been completed, as reservation jobs, and also allows the client apparatus to reserve the print jobs instead of the server in case of a failure therein. Also, at an increase in the reservation capacity of the server, the reservation job can be automatically uploaded from the client apparatus. Also when the client extracts the reservation job reserved in the server, an identical print image can be reproduced in case of output to a same printer and an output close to the original print image by the EMF data in case of output to a different printer.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for generating print data to be printed by a printing apparatus through a network, the information processing apparatus comprising:
    data generation means for generating device-dependent-format data to be printed by the printing apparatus using a printer driver corresponding to the printing apparatus;
    obtaining means for obtaining device-independent-format data;
    transmission control means for transmitting, to a print job management apparatus, reservation job data consisting of device-dependent-format data and device-independent-format data;
    display means for displaying a list of print jobs, reserved in the print job management apparatus, to be reprinted after print data is output to the printing apparatus;
    first judgment means for judging one print job selected by a user from among the print jobs displayed by said display means; and second judgment means for judging a printing apparatus to which the print job judged by said first judgment means is to be output, wherein said data generation means receives the device-independent-format data from the print job management apparatus and generates the device-dependent-format data using another printer driver, if the printing apparatus judged by said second judgment means is different from the printing apparatus of an original output destination, wherein the device-dependent-format data is data generated by a printer driver corresponding to a printing apparatus that prints out the print data, and the device-independent-format data is data generated prior to a generation process by a printer driver corresponding to a printing apparatus that prints out the print data.

2. An information processing apparatus according to claim 1, further comprising condition designation means for designating a reservation condition for causing said print job management apparatus to reserve the reservation job data.

3. An information processing apparatus according to claim 2, wherein said reservation condition is a period of reservation.

4. An information processing apparatus according to claim 2, wherein said reservation condition is a number of printing times.

5. An information processing apparatus according to claim 1, further comprising:

acquisition means for acquiring a list of managed reservation data from said print job management apparatus; and re-print designation means for designating the reservation data to be re-printed from said acquired list of the reservation data.

6. An information processing apparatus according to claim 5, wherein, in a case of receiving the device-independent-format data from said print job management means according to a re-printing instruction by said re-print designation means, print data generation means corresponding to the printing apparatus to be used for re-printing is selected among plural print data generation means, and the device-dependent-format data for said printing apparatus to be used for re-printing are generated from said device-independent-format data.

7. An information processing apparatus according to claim 6, wherein the device-dependent-format data generated at the re-printing of the device-independent-format data are reserved again as the reservation job data in said print job management apparatus.

8. An information processing method for generating print data to be printed by a printing apparatus through a network, the method comprising:

a data generation step of generating device-dependent-format data to be printed by said printing apparatus using a printer driver corresponding to the printing apparatus;

an obtaining step of obtaining device-independent-format data;

a transmission control step of transmitting, to a print job management apparatus, reservation job data consisting of device-dependent format data and device-independent format data;

a display step of displaying a list of print jobs, reserved in the print job management apparatus, to be reprinted after print data is output to the printing apparatus;

a first judgment step of judging one print job selected by a user from among the print jobs displayed by the display step; and a second judgment step of judging a printing apparatus to which the print job judged by the first judgment step is to be output, wherein said data generation step receives the device-independent-format data from the print job management apparatus and generates the device-dependent-format data using another printer driver, if the printing apparatus judged by the second judgment step is different from the printing apparatus of an original output destination, wherein the device-dependent-format data is data generated by a printer driver corresponding to a printing apparatus that prints out the print data, and the device-independent-format data is data generated prior to a generation process by a printer driver corresponding to a printing apparatus that prints out the print data.

9. An information processing method according to claim 8, further comprising a condition designation step of designating a reservation condition for causing said print job management apparatus to reserve the reservation job data.

10. An information processing method according to claim 9, wherein said reservation condition is a period of reservation.

11. An information processing method according to claim 9, wherein said reservation condition is a number of printing times.

12. An information processing method according to claim 8, further comprising:

an acquisition step of acquiring a list of managed reservation data from said print job management apparatus; and a re-print designation step of designating the reservation data to be re-printed from said acquired list of the reservation data.

13. An information processing method according to claim 12, wherein, in a case of receiving the device-independent-format data from said print job management step according to a re-printing instruction by said re-print designation step, print data generation means corresponding to the printing apparatus to be used for re-printing is selected among plural print data generation means, and the device-dependent-format data for said printing apparatus to be used for re-printing are generated from said device-independent-format data.

14. An information processing method according to claim 13, wherein the device-dependent-format data generated at the re-printing of the device-independent-format data are reserved again as the reservation job data in said print job management apparatus.

15. A computer readable memory medium storing a program of an information processing method for generating print data to be printed by a printing apparatus through a network, the program comprising:

a data generation step of generating device-dependent-format data to be printed by said printing apparatus using a printer driver corresponding to the printing apparatus;

an obtaining step of obtaining device-dependent-format data;

a transmission control step of transmitting, to a print job management apparatus, reservation job data consisting of device-dependent-format data and device-independent-format data;

a display step of displaying a list of print jobs, reserved in the print job management apparatus, to be reprinted after print data is output to the printing apparatus;

a first judgment step of judging one print job selected by a user from among the print jobs displayed by the display step; and a second judgment step of judging a printing apparatus to which the print job judged by the first judgment step is to be output, wherein said data generation step receives the device-independent-format data from the print job management apparatus and generates the device-dependent-format data using another printer driver, if the printing apparatus judged by the second judgment step is different from the printing apparatus of an original output destination, wherein the device-dependent-format data is data generated by a printer driver corresponding to a printing apparatus that prints out the print data, and the device-independent-format data is data generated prior to a generation process by a printer driver corresponding to a printing apparatus that prints out the print data.

16. A memory medium according to claim 15, the program further comprising a condition designation step of designating a reservation condition for causing said print job management apparatus to reserve the reservation job data.

17. A memory medium according to claim 16, wherein said reservation condition is a period of reservation.

18. A memory medium according to claim 16, wherein said reservation condition is a number of printing times.

19. A memory medium according to claim 15, the program further comprising:

an acquisition step of acquiring a list of managed reservation data from said print job management apparatus; and a re-print designation step of designating the reservation data to be re-printed from said acquired list of the reservation data.

20. A memory medium according to claim 19, wherein, in a case of receiving the device-independent-format data from said print job management step according to a reprinting instruction by said re-print designation step, print data generation means corresponding to the printing apparatus to be used for re-printing is selected among plural print data generation means, and the device-dependent-format data for said printing apparatus to be used for re-printing are generated from said device-independent-format data.

21. A memory medium according to claim 20, wherein the device-dependent-format data generated at the re-printing of the device-independent-format data are reserved again as the reservation job data in said print job management apparatus.

\* \* \* \* \*